No. 877,349. PATENTED JAN. 21, 1908.
W. LITTLE.
CULINARY VESSEL HEAT ECONOMIZING AND FLAME PROTECTING CASING.
APPLICATION FILED DEC. 4, 1905. RENEWED SEPT. 6, 1907.
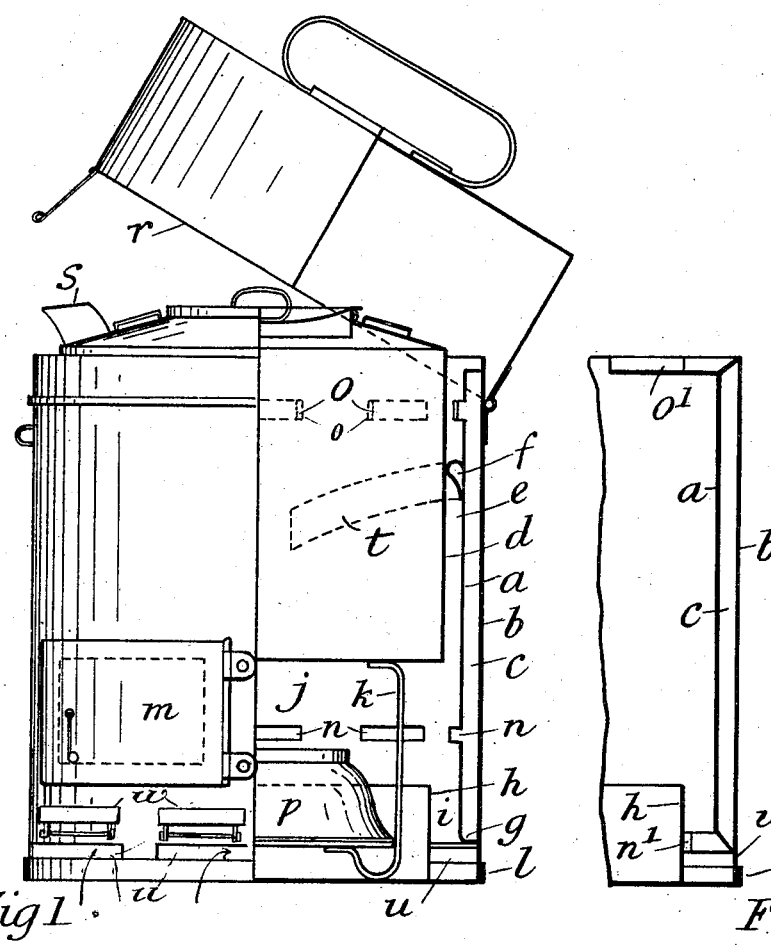
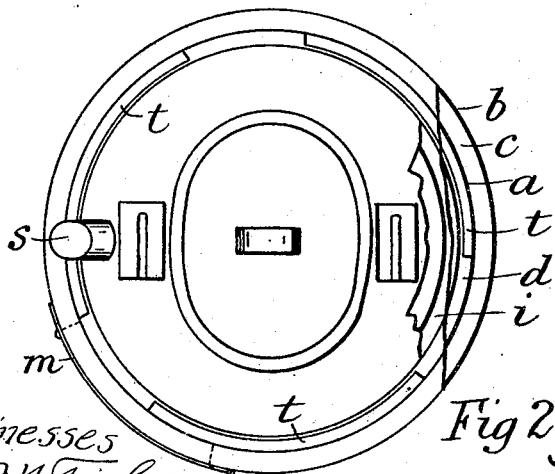
Inventor
William Little,
By Mason, Fenwick & Lawrence
Att'ys

UNITED STATES PATENT OFFICE.

WILLIAM LITTLE, OF BALLARAT, VICTORIA, AUSTRALIA.

CULINARY-VESSEL HEAT-ECONOMIZING AND FLAME-PROTECTING CASING.

No. 877,349.     Specification of Letters Patent.     Patented Jan. 21, 1908.

Application filed December 4, 1905. Serial No. 290,293. Renewed September 6, 1907. Serial No. 391,697.

*To all whom it may concern:*

Be it known that I, WILLIAM LITTLE, a subject of the King of Great Britain and Ireland, &c., residing at 25 Clarendon street, Ballarat, in the State of Victoria, Commonwealth of Australia, have invented certain new and useful Improvements in Culinary-Vessel Heat-Economizing and Flame-Protecting Casings; and I do hereby declare the following to be a full, clear, and exact description of the invention, such as will enable others skilled in the art to which it appertains to make and use the same.

The object of this invention is to provide protective and heat and space economizing devices or improvements usable in connection with a "billy", kettle, or other receptacle in which water is to be boiled, or a cooking or other operation conducted over a flame.

Where fire is used in the open air, produced by a spirit lamp, wind enormously reduces the effective heat of the flame, driving it in various directions, while strong wind readily puts such flame out. There is danger also in the use of unprotected flame in the open in forests and grassy country, or in railway carriages. Whether the flame be used out of doors or not the invention is applicable, for it economizes heat and space, rendering it possible to conduct the operation of heating safely in a very small space.

The invention consists in the provision of an adjustable or removable jacket having details as hereinunder, and of such size that when placed around the "billy", kettle, or vessel to be heated, there will be a particularly narrow space between the vessel and the jacket, which is itself mainly double with the intervening space narrow. Within the base of the jacket is a collar or deflector, there being wide intervening space, and air openings are provided in the jacket base, so that air may enter said space from without and pass upward to serve as a draft for, and director of the flame. The heated gases and the flame pass, as soon as they reach the edges of the bottom of the vessel to be heated, up between that vessel and the jacket. The heat is brought into intimate and prolonged contact with the said vessel, not only at its bottom, but around and up its sides. The space between the vessel and the jacket is provided with corrugations, ribs, or distance pieces, to keep the vessel to be heated central. The double jacket has its internal space partly open near the top and near the bottom as by means of slots to allow the passage of air. It has also one or more side doors or closable apertures to allow of the contained lamp being set going, regulated, inspected and extinguished. The jacket entirely prevents the escape of the fire within, acts as a safe guard against conflagrations, and against the blowing out of the flame, and is slotted where required to allow for spouts or projections from any vessel to be heated. Deflectors inside the jacket cause the heated gases and flame to pass upward otherwise than vertically when desired.

The double jacket acts as insulation: and it has been found that it so greatly prevents radiation outward of heat that a vessel of water brought to a boil within will keep hot many hours after it would have become cold if unprotected. The deflectors may act as the distance pieces aforesaid. Means as doors $u'$ are provided or used for adjusting or regulating in some cases the draft entering under or near the foot of the jacket. The casing if stood on wet ground in the rain with the lid partly open, still gives satisfactory results.

In describing the invention in further detail, reference will be made to the accompanying drawings which illustrate my improvements.

Figure 1 is a side elevation partly in vertical middle section, the lid being shown partly open; Fig. 2 shows a plan view of parts in Fig. 1, and Fig. 3 a slightly modified form of casing.

The parts lettered are: $a$— the inside of the jacket, or inner wall. $b$— the outside of the jacket, or outer wall. $c$— a narrow space between parts $a$ and $b$, closed except at upper air outlets and lower air inlets. $d$— a kettle or vessel to contain water to be boiled or for other use. $e$— a narrow space between vessel $d$ and the jacket inner wall. $f$— projections from wall $a$ extending inwardly as guides and preventing vessel $d$ being located out of center so as to close space $e$ at any side. $g$— closed base of jacket, or walls $a$ and $b$. $h$— collar to protect flame, and deflect draft, standing on bottom $l$. $i$— wide space between wall $a$ and collar $h$, so that there shall be ample air way to the lamp flame and so that liquid spilled down space $e$ shall fall clear of the lamp or fuel to be placed within and extend above the upper part of collar $h$. $j$— space for any suitable lamp, or fuel and flame. k— any suitable support for the vessel as d. This support is either attached to the lamp, or to collar h or to other convenient part. l— casing bottom secured to the jacket base. m— a side door (with or without a mica pane to allow of observation from without) through walls a and b,— or a slide giving access to the interior of the casing. n— aperture in lower part of wall a to let air enter space c from the casing interior. These apertures are lower in some cases, as at $n^1$ Fig. 3. o— apertures in upper part of wall a to let air leave space c inwardly. The air in, and the walls of space c will, when the lamp is alight, become heated, and prevent rapid cooling of the contents of vessel d when the flame is extinguished. $o^1$— (Fig. 3) a higher location which may be used of aperture for exit of air from space c. p— any suitable lamp or the like. r— the lid of the casing. s— a spout on vessel d. t— obliquely or spirally set ribs inside jacket a to cause heat to travel upward otherwise than vertically. These ribs are shown acting as guides f. u— air inlet apertures to space i at base of walls a and b.

The draft is regulated by opening lid r to a greater or less extent, or partially closing air inlets u in any convenient manner.

An important function of the collar h is to prevent strong wind or draft passing from without to the lamp and flame direct, and to prevent spray or rain driving thereto. The upward annular draft produced by the presence of collar h causes an annular form of flame which gives a desirable increase of heating effect. In making casings for both fuel and cooking utensils, some details above described may be omitted or altered while keeping within the scope of the invention, and the design and proportions of the parts may vary, but what is illustrated constitutes an efficient combination for general use. Thus some casings may be without lid r or door m; others may have several doors for access to different parts of a suitable source of heat; and projections $o^f$ at the edges of apertures o could act in place of parts f or t or both. No claim is made to any contained vessel d or its parts which vary at will.

What I do claim as my invention and desire to secure by Letters Patent of the United States is:—

1. A protective casing for removable vessels to be heated, having air inlets through its lower part to a source of heat space, an outer wall, and connected thereto an inner wall provided with upper and lower air apertures, said inner and outer walls arranged to form guides or inward projections, and a narrow air space therebetween for providing a heat non-conductor.

2. A protective casing for removable vessels to be heated, having air inlets through its lower part to a source of heat space, an outer wall, and connected thereto an inner wall provided with upper and lower air apertures, and with obliquely set inwardly projecting heat deflectors, a narrow air space being formed between the said walls.

3. The combination with a protective casing, for removable vessels to be heated, having air inlets at its lower part to a source of heat space, and having a double wall with an intermediate air space, the inner wall having upper and lower apertures, and suitable guides, of a collar at the casing base to direct the draft and flame.

In witness whereof I have hereunto set my hand in the presence of two witnesses.

WILLIAM LITTLE.

Witnesses:
 HENRY DUNSTAN,
 JAMES G. ANDERSON.